(12) United States Patent
Dai et al.

(10) Patent No.: US 9,152,219 B2
(45) Date of Patent: Oct. 6, 2015

(54) CREATION AND CONTEXT-AWARE PRESENTATION OF CUSTOMIZED EMOTICON ITEM SETS

(75) Inventors: Juan Dai, Sammamish, WA (US); Itai Almog, Redmond, WA (US); Taketoshi Yoshida, Tokyo (JP); Liang Chen, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 100 days.

(21) Appl. No.: 13/525,360

(22) Filed: Jun. 18, 2012

(65) Prior Publication Data

US 2013/0339983 A1    Dec. 19, 2013

(51) Int. Cl.
*G06F 3/01* (2006.01)

(52) U.S. Cl.
CPC ........................................ *G06F 3/01* (2013.01)

(58) Field of Classification Search
None
See application file for complete search history.

(56) References Cited

U.S. PATENT DOCUMENTS

| | | | |
|---|---|---|---|
| 6,629,793 B1 * | 10/2003 | Miller | 400/472 |
| 7,669,135 B2 | 2/2010 | Cunningham et al. | |
| 2004/0024822 A1 | 2/2004 | Werndorfer et al. | |
| 2005/0156873 A1 * | 7/2005 | Walter et al. | 345/156 |
| 2006/0009243 A1 * | 1/2006 | Dahan et al. | 455/466 |
| 2006/0015812 A1 * | 1/2006 | Cunningham et al. | 715/535 |
| 2008/0222687 A1 | 9/2008 | Edry | |
| 2008/0280633 A1 | 11/2008 | Agiv | |
| 2010/0240416 A1 | 9/2010 | Knight | |
| 2012/0059787 A1 | 3/2012 | Brown et al. | |
| 2012/0069028 A1 * | 3/2012 | Bouguerra | 345/473 |
| 2013/0024781 A1 * | 1/2013 | Douillet et al. | 715/752 |
| 2013/0151508 A1 * | 6/2013 | Kurabayashi et al. | 707/723 |

FOREIGN PATENT DOCUMENTS

| | | |
|---|---|---|
| WO | 02/099627 A1 | 12/2002 |
| WO | 2007/097598 A1 | 8/2007 |

OTHER PUBLICATIONS

Ginsburg, Suzanne, "Designing the iPhone User Experience—User-Centered Approach to Sketching and Prototyping iPhone Apps", Retrieved at <<http://mobilemarketingcn.com/ebooks/hotsaleebooks/designing-the-iphone-user-experience.pdf>>, Aug. 2010, pp. 1-327.

"Introducing Google Gadget by Google Talk", Retrieved at <<http://skytechgeek.com/2011/05/google-gadget-by-google-talk/>>, May 11, 2011, pp. 1-6.

Lee, et al., "Combining Context-Awareness with Wearable Computing for Emotion-based Contents Service", Retrieved at <<http://www.sersc.org/journals/IJAST/vol22/2.pdf>>,Proceedings of International Journal of Advanced Science and Technology, vol. 22, Sep. 2010, pp. 13-24.

(Continued)

*Primary Examiner* — Tuan Dao
(74) *Attorney, Agent, or Firm* — Jim Banowsky; Kate Drakos; Micky Minhas

(57) ABSTRACT

Embodiments provide context-aware inclusion of emoticon item sets in applications and/or services. The emoticon item sets include a plurality of emoticon images or other emoticons. A computing device creates custom emoticon item sets for each of the applications. Based on a determined execution context, the computing device selects the emoticon item set and presents the selected emoticon item set for use within the execution context by a user of the computing device.

20 Claims, 4 Drawing Sheets

(56) References Cited

OTHER PUBLICATIONS

"How to Use MSN Emoticons", Retrieved at <<http://www.tech-faq.com/how-to-use-msn-emoticons.html>>, Retrieved Date: Apr. 4, 2012, pp. 1-4.

"International Search Report & Written Opinion for PCT Application No. PCT/US2013/042944", Mailed Date: Aug. 4, 2014, 9 Pages.

\* cited by examiner

| EMOTICONS FOR "APPLICATION X" | | | | | | 402 |
|---|---|---|---|---|---|---|
| E1 | E2 | E3 | E4 | E5 | E6 | |
| E7 | E8 | E9 | E10 | E11 | E12 | |
| E13 | E14 | E15 | E16 | E17 | E18 | |
| abc | f | C1 | C2 | C3 | C4 | C5 | C6 | C7 | b |

FIG. 4

CREATION AND CONTEXT-AWARE PRESENTATION OF CUSTOMIZED EMOTICON ITEM SETS

BACKGROUND

Existing systems provide users with emoticons to include when composing messages. For example, social networking web sites provide emoticons for use within chat applications and email applications. Many of the social networking web sites provide customized sets of emoticons that represent the brand of the social network and entice users to join and use the services of the social network. Further, some of the social networking web sites frequently update the emoticons (e.g., adding holiday emoticons during holidays).

Many of the existing systems, however, only provide a standard set of emoticons for use in each of the applications. For example, many mobile telephones provide a standard emoticon picker for use in each of the applications. The standard set of emoticons, however, may not be compatible in every application.

SUMMARY

Embodiments of the disclosure create and provide customized emoticon item sets based on context. A computing device defines a plurality of the emoticon item sets for each of a plurality of applications associated with the computing device. Each of the plurality of emoticon item sets includes one or more emoticon items for use with one of the plurality of applications. The computing device detects an execution context of a user of the computing device and selects, based at least on the detected execution context, one of the defined plurality of emoticon item sets. The computing device presents the selected one of the defined plurality of emoticon item sets to the user during the detected execution context.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 4 is an exemplary user interface element illustrating an application-specific emoticon item set.

Corresponding reference characters indicate corresponding parts throughout the drawings.

DETAILED DESCRIPTION

Figure 1:
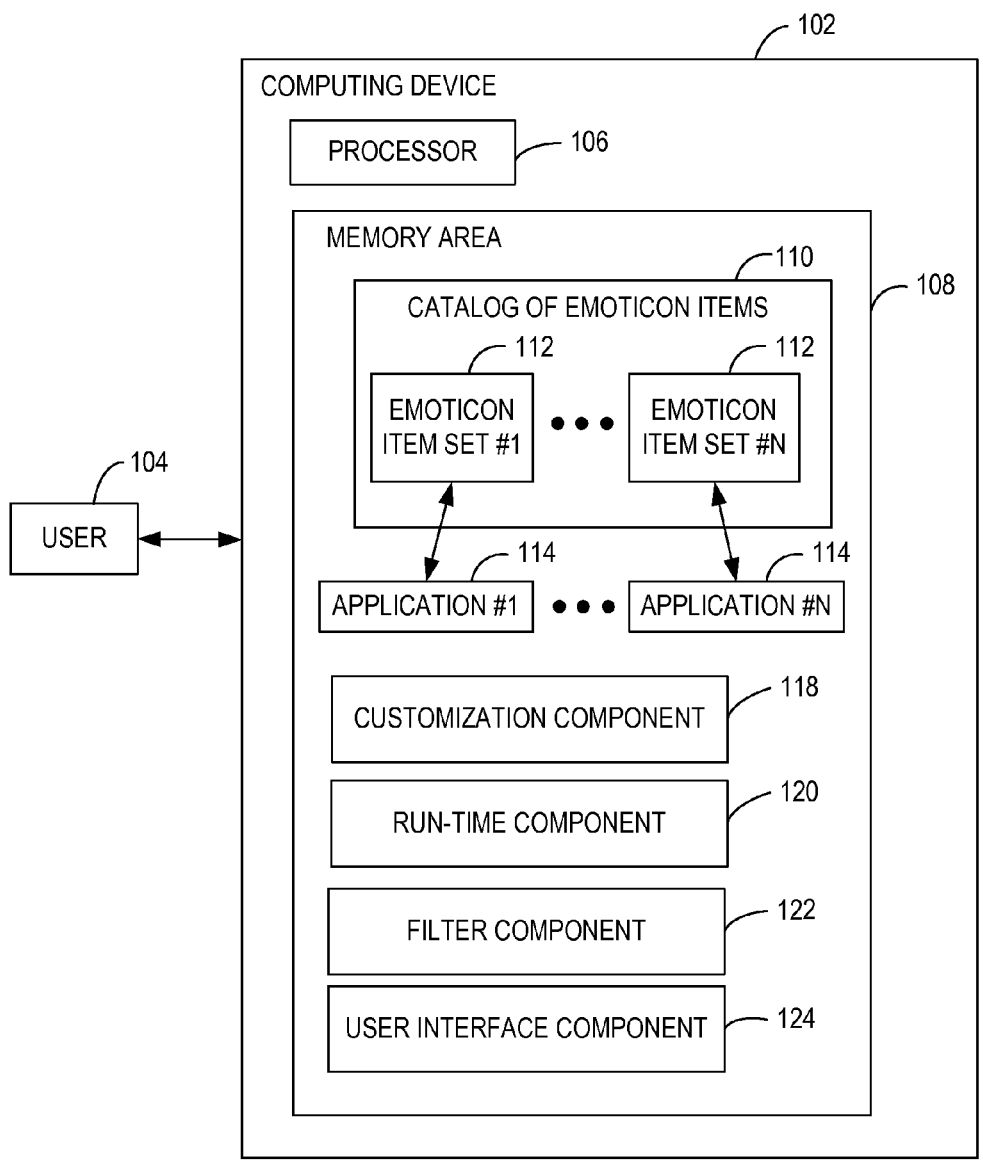
FIG. 1 is an exemplary block diagram illustrating a computing device storing a centralized catalog of emoticon items.

Referring to the figures, embodiments of the disclosure enable presentation of a customized set of emoticons based on context. For example, a computing device 102 detects an execution context, and selects and presents an emoticon item set 112 based thereon. In some embodiments, a standard or common user interface element is modified or populated with application-specific emoticon item sets 112. Applications (e.g., applications 114) and/or services provide emoticon items 302 and other emoticon data 202 for creation of the emoticon item sets 112. Aspects of the disclosure enable the applications 114 to customize the emoticon item sets 112, such as by organizing the emoticon items 302 into categories. The customized emoticon item sets 112 are available within the corresponding applications 114. In some embodiments, branded emoticons are integrated into the typing or message composition experience on the computing device 102.

Referring next to FIG. 1, an exemplary block diagram illustrates the computing device 102 storing a centralized catalog 110 of the emoticon items 302. In the example of FIG. 1, the computing device 102 is associated with a user 104. The computing device 102 represents any device executing instructions (e.g., as application programs, operating system functionality, or both) to implement the operations and functionality associated with the computing device 102. The computing device 102 may include a mobile computing device or any other portable device. In some embodiments, the mobile computing device includes a mobile telephone, laptop, tablet, computing pad, netbook, gaming device, and/or portable media player. The computing device 102 may also include less portable devices such as desktop personal computers, kiosks, and tabletop devices. Additionally, the computing device 102 may represent a group of processing units or other computing devices.

The computing device 102 has at least one processor 106, a memory area 108, and at least one user interface (not shown). The processor 106 includes any quantity of processing units, and is programmed to execute computer-executable instructions for implementing aspects of the disclosure. The instructions may be performed by the processor 106 or by multiple processors executing within the computing device 102, or performed by a processor external to the computing device 102. In some embodiments, the processor 106 is programmed to execute instructions such as those illustrated in the figures (e.g., FIG. 3).

The computing device 102 further has one or more computer readable media such as the memory area 108. The memory area 108 includes any quantity of media associated with or accessible by the computing device 102. The memory area 108 may be internal to the computing device 102 (as shown in FIG. 1), external to the computing device 102 (not shown), or both (not shown).

The memory area 108 stores, among other data, one or more of the applications 114 such as application #1 through application #N. The applications 114, when executed by the processor 106, operate to perform functionality on the computing device 102. The applications 114 are associated with the computing device 102. For example, the applications 114 may be installed on the computing device 102, pre-installed on the computing device 102, partially installed on the computing device 102, or otherwise available for execution by the computing device 102. Exemplary applications 114 include mail application programs, web browsers, calendar application programs, address book application programs, messaging programs, media applications, location-based services, search programs, and the like. The applications 114 may communicate with counterpart applications or services such as web services accessible via a network. For example, the applications 114 may represent downloaded client-side applications that correspond to server-side services executing in a cloud.

The memory area 108 further stores the catalog 110, collection, or other group of the emoticon items 302. Exemplary emoticon items 302 include, but are not limited to, graphical emoticons including emoticon images, font emoticons, and/ or text emoticons. The catalog 110 may store a plurality of emoticon item sets 112 such as emoticon item set #1 through emoticon item set #N. Each of the emoticon item sets 112 includes one or more of the emoticon items 302. In the example of FIG. 1, the emoticon item sets 112 represent a plurality of subsets of the emoticon items 302 stored in the catalog 110. While the memory area 108 in FIG. 1 is shown to store the emoticon items 302, aspects of the disclosure are operable with storing references (e.g., uniform resource locators) or other metadata linking to the actual emoticon items 302.

The catalog 110 in FIG. 1 is a centralized catalog at least because the catalog 110 applies, or is available, to a plurality of the applications 114. Each of the emoticon item sets 112 corresponds to one of the applications 114. In some embodiments, each of the emoticon item sets 112 corresponds to a different one of the applications 114. The catalog 110 is also centralized in that the customizations available for each of the emoticon item sets 112 are standardized across the applications 114.

While illustrated as the single catalog 110 in FIG. 1, aspects of the disclosure are operable with a plurality of catalogs 110. For example, the emoticon item sets 112 may each be encapsulated or associated with separate catalogs 110.

Aspects of the disclosure are operable with any structure for storing the emoticon item sets 112. An exemplary structure for storing each of the emoticon item sets 112 includes one or more fields and one or more field values. The emoticon items 302 may also be arranged into categories. Exemplary fields and field values for a particular category are shown in Table 1 below.

TABLE 1

Exemplary Fields and Field Values for a Category of Emoticon Items.

| Field | Field Value |
| --- | --- |
| Category number | 1 |
| Category name | "Application #X Emoticons" |
| Ordered Emoticon List for Category | The list of emoticons from Application #X which will show in the Category |
| Are the emoticons graphical? | Yes |
| Backend Text String | Textual data for each emoticon item in this Category |

The backend text strings in Table 1 above include, for example, the string "/smile" for a yellow smiley face graphic.

Figure 2:
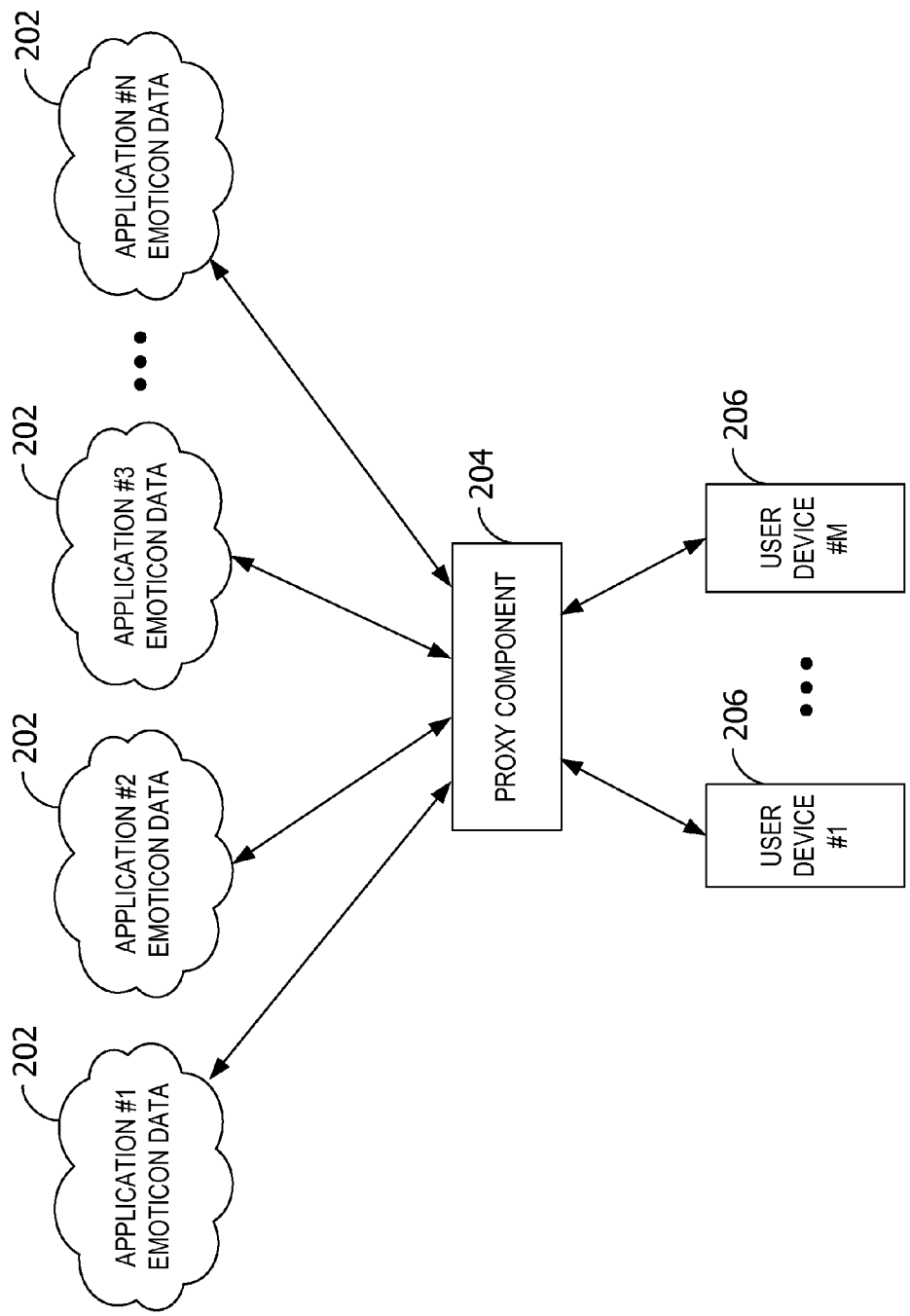
FIG. 2 is an exemplary block diagram illustrating a proxy component providing application-specific emoticon data to a plurality of user devices.

The fields in Table 1 above define the emoticon data that the computing device 102 receives from the services (e.g., via a proxy component 204 as shown in FIG. 2). In some embodiments, the fields represent the standard format of emoticon data definition for all the services. When the computing device 102 receives the data for a specific application 114, the computing device 102 then knows how many categories to show in the emoticon picker for that application 114 and what emoticon items to show in each of the categories.

The memory area 108 further stores one or more computer-executable components. Exemplary components include a customization component 118, a run-time component 120, a filter component 122, and a user interface component 124. Execution of these components is described below with reference to FIG. 3.

In some embodiments, the user interface (not shown) includes a graphics card for displaying data to the user 104 and receiving data from the user 104. Further, the user interface may include a display (e.g., a touch screen display). The user interface may also include one or more of the following to provide data to the user 104 or receive data from the user 104: speakers, a sound card, a camera, a microphone, a vibration motor, one or more accelerometers, a BLUETOOTH brand communication module, global positioning system (GPS) hardware, and a photoreceptive light sensor. For example, the user 104 may input commands or manipulate data by moving the computing device 102 in a particular way.

The computing device 102 may also include a communications interface (not shown). For example, the communications interface may include a network interface card and/or computer-executable instructions (e.g., a driver) for operating the network interface card. Communication between the computing device 102 and other devices or components (e.g., proxy component 204 in FIG. 2) may occur using any protocol or mechanism over any wired or wireless connection. In some embodiments, the communications interface is operable with near-field communication (NFC) tags.

In the example of FIG. 1, the computing device 102 of the user 104 creates the catalog 110 of the emoticon items 302, stores the emoticon items 302, and provides the relevant (e.g., application-specific) emoticon items 302 to the applications 114 based on context. In other embodiments, however, one or more operations performed by the computing device 102 may be performed by another device or entity, such as next described with reference to FIG. 2.

Referring next to FIG. 2, an exemplary block diagram illustrates the proxy component 204 providing application-specific emoticon data 202 to a plurality of user devices 206. In the example of FIG. 2, the proxy component 204 represents any entity with computational capability that communicates with a plurality of the user devices 206 such as user device #1 through user device #M. For example, the proxy component 204 may be implemented as, or associated with, a web service or cloud service.

In the example in FIG. 2, application-specific or service-specific emoticon data 202 (e.g., emoticon items 302, descriptions, etc.) is stored separately from the user devices 206. For example, a cloud service stores application #1 emoticon data 202 through application #N emoticon data 202. As described above with reference to FIG. 1, the user devices 206 execute one or more of the applications 114, including computer-executable instructions for communicating with the proxy component 204. For example, based on the execution context of a particular one of the user devices 206 (e.g., see FIG. 3), the user device 206 obtains, via the proxy component 204, the emoticon data 202 relevant to the execution context and presents the obtained emoticon data 202 to the user 104 within or during the execution context.

The emoticon data 202 for one or more of the applications 114 or services may be accessed via one or more interfaces and/or protocols. In some embodiments, the proxy component 204 defines and abstracts these interfaces from the user devices 206 thus enabling the user devices 206 to obtain emoticon data 202 for a plurality of applications 114 and/or services without each of the user devices 206 being configured or programmed individually with each of the interfaces.

In some embodiments, the proxy component 204 also relays or provides notification of updates to the emoticon data 202 to one or more of the user devices 206. Providing the notifications to the user devices 206 enables the user devices 206 to request updated emoticon data 202 in scenarios in which the user devices 206 have cached or otherwise stored at least a portion of the emoticon data 202.

Figure 3:
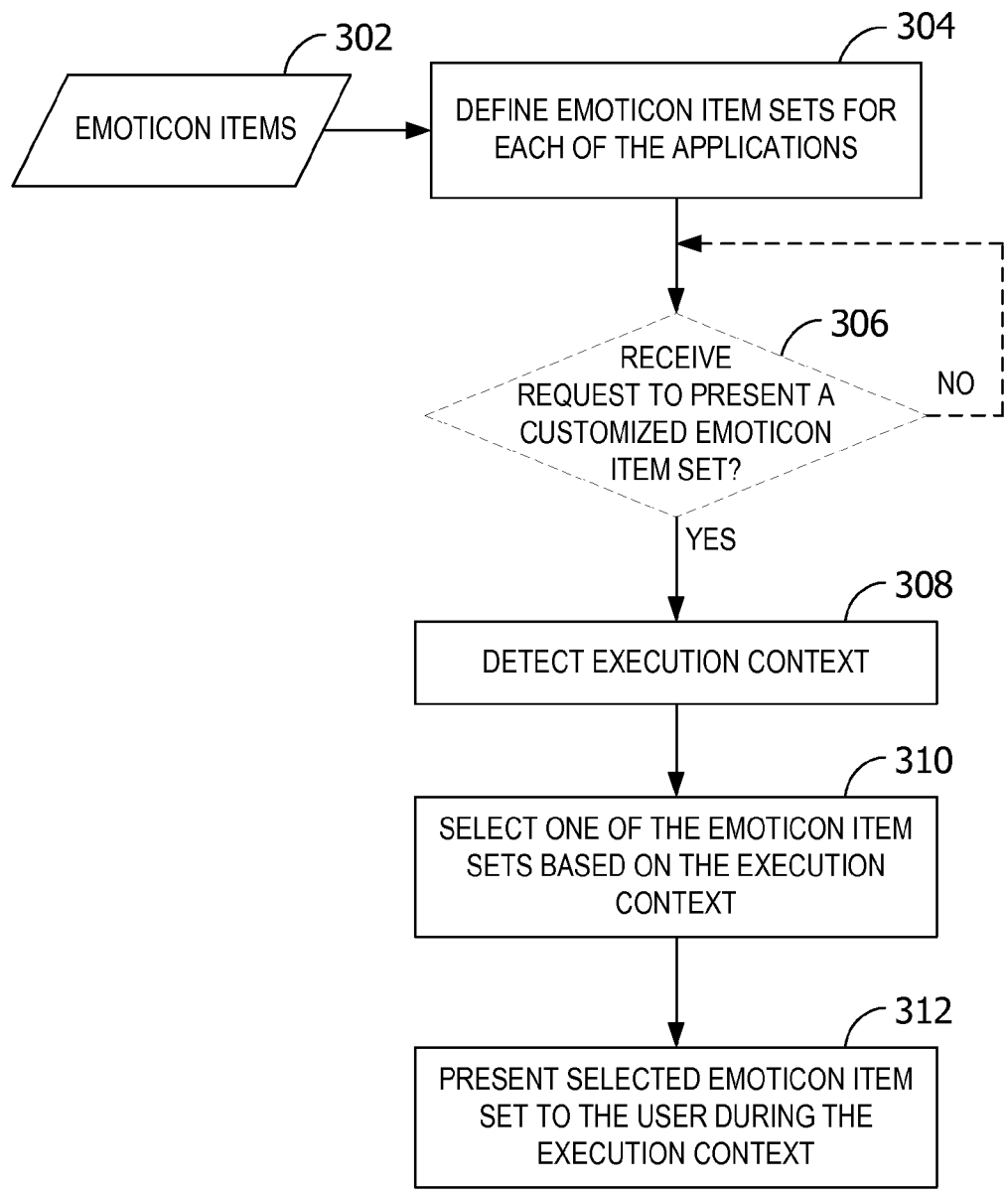
FIG. 3 is an exemplary flow chart illustrating operation of the computing device to select and provide an emoticon item set based on an execution context.

Referring next to FIG. 3, an exemplary flow chart illustrates operation of the computing device 102 to select and provide one of the emoticon item sets 112 based on an execution context. While the operations illustrated in FIG. 3 are described as being performed by the computing device 102, one or more of the operations may be performed by any computing device including mobile telephones, tablets, and laptops, as described above. Further, while the operations illustrated in FIG. 3 are described as being performed by an operating system (or other kernel level process), one or more of the operations may be performed by at least one of the applications 114 (or other user level process).

At 304, an operating system executing on the computing device 102 takes a plurality of the emoticon items 302 as input to define or populate a plurality of emoticon item sets 112 for each of a plurality of the applications 114 associated with the computing device 102. For example, the operating system may respond to a request from one of the applications 114 to populate the centralized catalog 110, or may proactively define the emoticon item sets 112 for the applications 114 installed on the computing device 102.

The operating system defines the emoticon items 302 for use with the applications 114 by, for example, downloading the emoticon items 302 (or emoticon item sets 112) from web sites or services associated with each the applications 114. In such embodiments, services of the applications 114 create or define the sets of the emoticon items 302 and make the defined sets of the emoticon items 302 available for download from servers hosted by the services. The operating system on the computing device 102 may receive identification of at least one category associated with the obtained emoticon items 302. The operating system stores the obtained emoticon items 302 in the centralized catalog 110 as part of the identified category. After downloading a particular set of the emoticon items 302 for the first time, the computing device 102 caches the emoticon data from the server and then update the emoticon data responsive to update notifications received from the services thereafter.

In other embodiments, a customized emoticon item set is installed on the computing device 102 (e.g., the catalog 110 is updated) when the corresponding application 114 is installed on the computing device 102. In still other embodiments, a separate emoticon installation application may be executed by the user 104 to add a customized emoticon item set to the catalog 110. In such embodiments, an operating system receives a request from the emoticon installation application to register the customized emoticon item set. In response to the received request, the operating system updates the catalog 110 with the customized emoticon item set.

The operating system further defines the emoticon item sets 112 by, for example, customizing one or more of the following: a quantity of categories for the emoticon items 302, a label (e.g., representative text and/or representative graphics) for each of a plurality of categories for the emoticon items 302, and a quantity of the emoticon items 302 allowable in each of a plurality of categories for the emoticon items 302. Exemplary categories correspond to emotions such as happiness, sadness, anger, joy, and laughter. The operating system may also customize the actual emoticon items 302. For example, the operating system may adjust font, colors, size, and other attributes of the emoticon items 302, as well as the actual content of the emoticon items 302 (e.g., add a watermark or logo, remove offensive text, etc.).

The operating system or other logic executed by the computing device 102 may further maintain the defined emoticon item sets 112. For example, the operating system may receive updated emoticon items 302 (e.g., from web sites associated with the applications 114) for association with one or more of the defined emoticon item sets 112.

The operating system selects and presents one of the defined emoticon item sets 112 based on an execution context of the computing device 102 and/or user 104. For example, at 308, the operating system detects the execution context before selecting and presenting the relevant emoticon item set 112. Detecting the execution context includes, for example, identifying one of the plurality of applications 114 being executed by the computing device 102. In an optional or alternative embodiment, the operating system receives at 306 an explicit request from one of the applications 114 to present one of the emoticon item sets 112. In such an embodiment, the operating system may skip the context detection operation and instead proceed to selecting and presenting the relevant emoticon item set 112 to the requesting application 114.

At 310, the operating system selects one of the defined plurality of emoticon item sets 112 based at least on the detected execution context. For example, the operating system identifies the application 114 currently being executed by the computing device 102 that is currently active, on top, in the foreground, the focus of the user interface selection device, or otherwise intended by the user 104 to display one of the emoticon item sets 112. The operating system then searches the memory area 108 of the computing device 102 for the emoticon item set 112 associated with the identified application 114. In embodiments in which the computing device 102 stores references to the emoticon items 302 in the emoticon item sets 112 rather than storing the actual emoticon items 302 (e.g., to reduce a storage burden on the computing device 102), the operating system obtains the emoticon items 302 for the selected emoticon item set 112 via the references. For example, the operating system downloads the emoticon items 302 from a server associated with the identified application 114 and caches the emoticon items 302 for a defined duration of time (e.g., six months).

If the operating system determines that the computing device 102 does not have an emoticon item set 112 defined for the detected execution context, the operating system displays a standard set of emoticon items 302 or attempts to create the emoticon item set 112. For example, the operating system may search a network (e.g., the Internet) for the emoticon item set 112.

At 312, the operating system presents, or provides for display, the selected emoticon item set 112 to the user 104 during or within the detected execution context. For example, the operating system may provide the selected emoticon item set 112 to the user 104 in a user interface element, or may provide the selected emoticon item set 112 to the identified application 114. The identified application 114 then displays or presents the selected emoticon item set 112 to the user 104 within the execution context of the identified application 114.

In some embodiments, one or more computer storage media such as the memory area 108 embody computer-executable components such as those illustrated in FIG. 1 to perform one or more of the operations illustrated in FIG. 3. For example, the customization component 118, when executed by the processor 106 of the computing device 102, causes the processor 106 to create the centralized catalog 110 for a plurality of the applications 114. The customization component 118 creates the centralized catalog 110 by identifying the applications 114 installed on the computing device 102, obtaining one of the emoticon item sets 112 for each of the identified applications 114, and storing each of the obtained emoticon item sets 112 in the centralized catalog 110. Obtaining the emoticon item sets 112 includes, in some embodiments, downloading the emoticon item sets 112 from web sites associated with the identified applications 114. The downloaded emoticon item sets 112 may be each branded by the applications 114 or by the web sites (e.g., social networking web sites).

The run-time component 120, when executed by the processor 106 of the computing device 102, causes the processor 106 to detect an execution context of the user 104 of the computing device 102. The filter component 122, when executed by the processor 106 of the computing device 102, causes the processor 106 to select, based at least on the execution context detected by the run-time component 120, one of the emoticon item sets 112 from the centralized catalog 110 created by the customization component 118.

The user interface component 124, when executed by the processor 106 of the computing device 102, causes the processor 106 to present the one of the emoticon item sets 112 selected by the filter component 122 to the user 104 within the execution context detected by the run-time component 120. For example, the user interface component 124 presents the selected one of the emoticon item sets 112 to the user 104 in a user interface element within the detected execution context. Exemplary user interface elements include, but are not limited to, a popup, a hover window, an overlay, or a virtual keyboard. The user interface component 124 may also include computer-executable instructions (e.g., a driver) for operating the graphics card and/or computer-executable instructions (e.g., a driver) for operating the display.

In some embodiments, the customization component 118 further creates a popularity tab within the user interface element displaying the selected emoticon item set 112. The popularity tab, when selected by the user 104, displays the emoticon items 302 from the selected emoticon item set 112 that are frequently selected by the user 104 or by a plurality of users 104 (e.g., across a plurality of the computing devices 102 of the plurality of users 104). The emoticon items 302 displayed in the popularity tab may be ordered, organized, sorted, ranked, or otherwise arranged based on the frequency of use or selection of the emoticon items 302.

Referring next to FIG. 4, an exemplary user interface element 402 illustrates an application-specific emoticon item set 112. For each emoticon item set 112, the computing device 102 populates the user interface element 402 with emoticon items and categories from the emoticon item set 112, such as described herein. In the example of FIG. 4, the user interface element 402 is displayed within Application X when the user 104 is entering data (e.g., composing a message). The user interface element 402 shows only the emoticon items associated with Application X.

The exemplary emoticon items in FIG. 4 are represented by the text E1, E2, . . . , E18 for clarity. In operation, the actual emoticon images are displayed for selection by the user 104. Further, the user interface element 402 may display only a portion of the emoticon items and enable the user 104 to scroll through additional emoticon items.

The user interface element 402 also displays a plurality of categories represented by the text C1, C2, . . . , C7 for clarity. In operation, images or descriptive text representing each of the categories is displayed for selection by the user 104. When the user 104 selects one of the categories, the emoticons associated with the selected category are displayed.

A portion of the user interface element 402 in FIG. 4 also displays "abc" that, when selected, displays a virtual alphabetic or alphanumeric keyboard enabling the user 104 to enter letters and/or numbers. The user interface element 402 may include other portions for functions such as a backspace function and a portion displays a list or set of frequently used emoticon items associated with Application X.

Additional Examples

At least a portion of the functionality of the various elements in FIG. 1 and FIG. 2 may be performed by other elements in FIG. 1 and/or FIG. 2, or an entity (e.g., processor, web service, server, application program, computing device, etc.) not shown in FIG. 1 or FIG. 2.

In some embodiments, the operations illustrated in FIG. 3 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While no personally identifiable information is tracked by aspects of the disclosure, embodiments have been described with reference to data monitored and/or collected from users 104. In such embodiments, notice is provided to the users 104 of the collection of the data (e.g., via a dialog box or preference setting) and users 104 are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible, exclude propagated data signals, and are mutually exclusive to communication media. In some embodiments, computer storage media are implemented in hardware. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, embodiments of the invention are operational with numerous other general purpose or special purpose computing system environments or configurations. Examples of well-known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like. Such systems or devices may accept input from the user 104 in any way, including from input devices such as a keyboard or pointing device, via gesture input, and/or via voice input.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for customization of the centralized catalog 110 by the applications 114 executing on the mobile computing device, and exemplary means for integrating social network branded emoticon items with a user interface element associated with data entry on the mobile computing device.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system comprising:
a memory area associated with a mobile computing device, said memory area storing a centralized catalog of emoticon images for a plurality of applications associated with the mobile computing device, wherein a plurality of subsets of the emoticon images in the centralized catalog are associated with the plurality of applications; and
a processor programmed to:
populate, by an operating system executing on the mobile computing device, the centralized catalog with the emoticon images received from the plurality of applications;
detect, by the operating system, an execution context of a user of the mobile computing device;
select, by the operating system, one of the plurality of subsets of the emoticon images based at least on the detected execution context; and
present, by the operating system, the selected one of the plurality of subsets of the emoticon images to the user within the detected execution context in a user interface element, wherein the user interface element is modified for the plurality of applications based on the selected one of the plurality of subsets, wherein a popularity tab is created within the user interface element that displays, upon selection by the user, one or more emoticon images frequently selected by the user from the selected one of the plurality of subsets, wherein the one or more frequently selected emoticon images are arranged in the popularity tab based on a frequency of selection.

2. The system of claim 1, wherein the processor is programmed to detect the execution context by identifying at least one of the applications being executed by the mobile computing device.

3. The system of claim 2, wherein the processor is programmed to present the selected one of the plurality of subsets by providing the selected one of the plurality of subsets to the at least one of the applications being executed by the mobile computing device.

4. The system of claim 1, wherein the processor is programmed to populate the centralized catalog by:
receiving identification of at least one category associated with the received emoticon images; and
storing the received emoticon images in the centralized catalog as part of the received identification of the at least one category.

5. The system of claim 1, wherein the processor is further programmed to organize the centralized catalog stored in the memory area according to one or more categories.

6. The system of claim 1, wherein the processor is further programmed to identify one or more categories of the emoticon images by representative text or a representative graphic.

7. The system of claim 1, further comprising means for customization of the centralized catalog by the plurality of applications executing on the mobile computing device.

8. The system of claim 1, further comprising means for integrating social network branded emoticon items with the user interface element associated with data entry on the mobile computing device.

9. A method comprising:
defining, by an operating system executing on a computing device, a plurality of emoticon item sets for a plurality of applications associated with the computing device;
detecting, by the operating system, an execution context of a user of the computing device;
selecting, by the operating system, one of the defined plurality of emoticon item sets based at least on the detected execution context, wherein a different one of the defined plurality of emoticon item sets is selected for a different detected execution context; and
presenting, by the operating system, the selected one of the defined plurality of emoticon item sets to the user during the detected execution context in a user interface element, the user interface element being modified for the plurality of applications based on the selected one of the defined plurality of emoticon item sets, wherein a first portion of the user interface element displays a list of emoticon items frequently selected, by a plurality of users, from the selected one of the defined plurality of emoticon item sets, a second portion of the user interface element displays a plurality of categories corresponding to the selected one of the defined plurality of emoticon item sets, and a third portion of the user interface element enables the user to enter text input.

10. The method of claim 9, wherein defining the plurality of emoticon item sets comprises customizing one or more of the following: a quantity of categories for the emoticon items, and a quantity of the emoticon items allowable in one or more of a plurality of categories for the emoticon items.

11. The method of claim 9, wherein defining the plurality of emoticon item sets comprises downloading the plurality of emoticon item sets from one or more services associated with the plurality of applications.

12. The method of claim 9, wherein defining the plurality of emoticon item sets comprises defining the plurality of emoticon item sets including one or more of the following: graphical emoticons, font emoticons, and text emoticons.

13. The method of claim 9, wherein detecting the execution context comprises identifying one of the plurality of applications being executed by the computing device, and further comprising downloading emoticon items associated with the selected one of the defined plurality of emoticon item sets from a server associated with the one of the plurality of applications.

14. The method of claim 9, further comprising receiving an updated emoticon item or association with at least one of the defined plurality of emoticon item sets.

15. One or more computer storage media embodying computer-executable components, said components comprising:
   a customization component that on execution causes at least one processor of a computing device to create a centralized catalog for a plurality of applications by:
      identifying the plurality of applications installed on the computing device,
      obtaining emoticon item sets for the identified applications, and
      storing the obtained emoticon item sets in the centralized catalog;
   a run-time component that on execution causes at least one processor of the computing device to detect an execution context of a user of the computing device;
   a filter component that on execution causes at least one processor of the computing device to select, based at least on the execution context detected by the run-time component, one of the emoticon item sets from the centralized catalog created by the customization component; and
   a user interface component that on execution causes at least one processor of the computing device to present the one of the emoticon item sets selected by the filter component to the user within the execution context detected by the run-time component, wherein the user interface component presents the selected one of the emoticon item sets to the user in a user interface element modified for the identified a applications based on the selected one of the emoticon item sets within the detected execution context, the customization component creates a popularity tab within the user interface element, the popularity tab displaying, upon selection by the user, one or more emoticon items frequently selected by the user from the selected one of the emoticon item sets, wherein the one or more emoticon items frequently selected in the popularity tab are arranged based on a frequency of selection.

16. The computer storage media of claim 15, wherein the customization component obtains the emoticon item sets by downloading the emoticon item sets from web sites associated with the identified applications.

17. The computer storage media of claim 15, wherein a first portion of the user interface element displays, a list of emoticon items frequently selected by a plurality of users from the selected one of the emoticon item sets, a second portion of the user interface element displays a plurality of categories corresponding to the selected one of the emoticon item sets, and a third portion of the user interface element enables the user to enter text input.

18. The computer storage media of claim 15, wherein the customization component obtains the emoticon item sets by obtaining emoticon item sets branded by a social networking web site associated with one of the identified applications.

19. The computer storage media of claim 15, wherein the centralized catalog is organized according to one or more categories.

20. The computer storage media of claim 15, wherein the execution context of the user is detected by identifying at least one of the identified applications being executed by the computing device.

* * * * *